March 3, 1959 J. R. ANDERSON 2,876,436

ELECTRICAL CIRCUITS EMPLOYING FERROELECTRIC CAPACITORS

Filed Feb. 7, 1956 2 Sheets-Sheet 1

INVENTOR
J. R. ANDERSON
BY
[signature]
ATTORNEY

ELECTRICAL CIRCUITS EMPLOYING FERROELECTRIC CAPACITORS

Filed Feb. 7, 1956 2 Sheets-Sheet 2

INVENTOR
J. R. ANDERSON
BY [signature]
ATTORNEY

United States Patent Office 2,876,436

Patented Mar. 3, 1959

2,876,436

ELECTRICAL CIRCUITS EMPLOYING FERROELECTRIC CAPACITORS

John R. Anderson, Berkeley Heights, N. J., assignor to Bell Telephone Laboratories, Incorporated, New York, N. Y., a corporation of New York Application February 7, 1956, Serial No. 564,024

18 Claims. (Cl. 340—173)

This invention relates to electrical storage circuits and, more particularly, to storage circuits employing ferroelectric capacitors.

One of the problems relating to ferroelectric storage circuits is that of obtaining a high signal-to-noise ratio output signal. The signal-to-noise ratio of a storage circuit may be defined as the ratio of the output signal when a digit or "1" is sensed or read out to that output signal derived when a "0" is sensed or read out. In the instance of ferroelectric capacitors, the output signal is derived as an electrical charge. Therefore, the ratio of the respective charges must be large in order to have a usable storage capacitor. There are, however, at least four factors which may cause a decrease in the signal-to-noise ratio of ferroelectric capacitors. First, ferroelectric capacitors having barium titanate as the storage crystal frequently exhibit a form of decay herein referred to as type I decay. This decay results in a decreased signal-to-noise ratio output signal in that it effectively decreases the "1" or digit output signal. A second factor is the internal bias sometimes exhibited by certain other ferroelectric materials, such as guanidinium aluminum sulphate hexahydrate, as disclosed in B. T. Matthias application Serial No. 489,193, filed February 18, 1955. The effect of the internal bias is to increase the output signal delivered when a "0" is sensed and decrease the output signal when a "1" is sensed. The third factor factor is the frequent occurrence of ferroelectric capacitors exhibiting a nonsquare hysteresis loop such as those exhibited by small crystals of guanidinium aluminum sulphate hexahydrate. Capacitors exhibiting nonsquare hysteresis loops have narrow voltage margins of operation. These capacitors are too unstable to be employed in storage circuits of the type known in the art, as a high degree of stability is required. A fourth factor is the effect of disturbing pulses on the unselected capacitors of a ferroelectric matrix. During the storage and read-out of information relative to a ferroelectric matrix, pulses are applied to various unselected capacitors. The effect of these disturbing pulses is to partially reverse some of the domains of the ferroelectric material to such point that ultimately the initially stored informaion must be restored even though it has not been read out.

Recently developed ferroelectric capacitors, which may interchangeably be called condensers, do not seem to undergo any appreciable permanent change in electrical characteristics even after hundreds of hours of continual operation. They do, however, exhibit under some pulse conditions the above referred to type I decay which is a temporary build-up of space charge within the crystal. This build-up of space charge may not be a serious problem in some ferroelectric circuits wherein, after each store cycle, a fairly large recovery or store pulse is applied to each ferro electric condenser. Further as the build-up of this space charge is dependent on the time interval between succesive pulses applied to a condenser, this build-up will be inhibited if the condensers are sensed at a high rate. However, for other applications the occurrence of this decay due to space charge build-up may be a serious limitation.

Accordingly, it is an object of this invention to provide improved storage circuits.

It is another object of this invention to provide storage circuits having a high signal-to-noise ratio.

It is a still further object of this invention to provide ferroelectric storage circuits exhibiting no type I decay.

It is a further object of this invention to provide improved ferroelectric storage circuits capable of employing ferroelectric capacitors exhibiting a nonsquare hysteresis loop.

It is a further object of this invention to provide a ferroelectric storage circuit in which the effect of the internal bias upon the storage capabilities is effectively eliminated.

During the decay process, apparently, either positive carriers are passing to the capacitor from the direction of the pulse source and/or negative carriers are passing to the opposite electrode of the capacitor. When these carriers become trapped in the crystal, the decay process takes place. If the polarity of the applied store pulse is reversed, the sign of the injected carriers appears to be reversed. Since with large pulse voltages decay occurs only when there is an off time between pulses, the injection of carriers must take place during this off time. When negative store pulses are applied, decay is prevented if positive carriers are prevented from reaching that electrode of the capacitor nearest the pulse source or if negative carriers are prevented from reaching the electrode of that capacitor remote from the pulse source. Therefore, in accordance with one aspect of this invention, the passage of carriers to the crystals is blocked by using saturation diodes or other voltage responsive devices connected in series with the ferroelectric capacitor thereby preventing decay.

As disclosed in The Bell System Technical Journal, volume 33, No. 4, July 1954, page 827, silicon junction diodes exhibit a reverse current saturation characteristic which may be employed to control the flow of current, or in this particular instance, act as a voltage responsive switch. The silicon diode conducts current in a forward direction in the manner of an ordinary diode. When an increasing voltage is applied in the reverse direction, the diode initially presents a high impedance and practically no current flows through the diode until a saturation voltage is impressed, at which point the reverse current increases rapidly without a further increase in the reverse voltage. This is explained on the basis that, when the saturation voltage is reached, the electrons and/or holes which comprise the leakage current are given sufficient energy to create other electron-hole pairs which add to the original reverse current.

If a single anode saturation diode is connected with proper polarity in series with the ferroelectric capacitor, the build-up of space charge is prevented. Under actual operation, a barium titanate crystal, having electrodes 0.021 inch by 0.021 inch wide connected in series with a silicon diode having a 16 volt breakdown or avalanche voltage, exhibited only a 6 percent drop in total charge in one hour of pulsing and no further change occurred for the next seventeen hours of pulsing. Without the diode in the circuit, the charge switched dropped 50 percent within two minutes of pulsing. Decay is prevented only when the single diode is poled in a direction to oppose the read-out pulses. If the polarities of either the read-out pulses or the diode are reversed, rapid decay takes place.

The single series diode is not as effective in preventing the build-up of space charge in capacitors having a relatively small electrode area. For example, a capacitor having electrodes 0.004 inch by 0.004 inch decayed with the series diode but at a much slower rate than when no diode was used. If a diode is connected to each electrode of a ferroelectric capacitor in series aiding polarity, the combination is more effective in preventing type I decay than the previously mentioned single diode ferroelectric capacitor combination. These diodes are both poled in a direction to aid the store pulse and oppose the readout or sensing pulse. One explanation of the effectiveness of the separate single anode diodes on each side of the capacitor in preventing type I decay is that a voltage is maintained across the crystal after the storage pulse. For example, if the cathodes of the diodes are connected nearest to the pulse source and negative store pulses are employed, the capacitor electrode nearest the pulse source will remain negatively charged with respect to the other capacitor electrode after a negative pulse. After a positive pulse, the capacitor is completely discharged.

When two silicon junction diodes of approximately the same saturation characteristics are connected in series opposition in a circuit a bilateral voltage responsive device results in which the effect is to prevent the passage of current through this series circuit on the application of increasing voltages of either polarity until a certain saturation or breakdown voltage is reached, at which point the reverse current begins to flow through the opposing diode and this reverse current rapidly increases. Similarly, when the voltage applied across this series circuit is reversed, the saturation takes place in the other saturation diode. The two silicon junction diodes referred to may be a pair of separate units connected in series opposition or they may comprise a single unit integrally formed by depositing semiconductor layers of one impurity type upon opposite sides of a semiconductor layer of another impurity type to obtain the same effect. In the latter case, the unit may be designated a double anode saturation diode. Any other bilateral voltage responsive device, such as a gas diode, would perform the same operation of circuit isolation and switching, if substituted for the double anode diode.

When a pair of silicon junction diodes of approximately the same saturation characteristics are connected in series opposition and in series with a single crystal ferroelectric capacitor, the series circuit exhibits novel characteristics. The apparent coercive force of the ferroelectric capacitor is increased by the breakdown voltage of a single diode to pulses of either polarity. Another important change brought about by the combination is a large increase in the squareness of the hysteresis loop as compared with the hysteresis loop of the capacitor above so that the margins on coincident voltage storage can be placed entirely within the margins of the diode.

If two pairs of saturation diodes, each pair connected in series opposition, are connected to opposite electrodes of a ferroelectric capacitor, the resulting circuit is more effective to prevent type I decay than a circuit containing a single pair of diodes on only one side of the capacitor. However, the resultant hysteresis loop is increased by twice the breakdown or saturation voltage of a single anode saturation diode. This hysteresis loop obtains though the hysteresis loop of the capacitor alone is nonsquare or even though the capacitor exhibits an internal bias. If, when no information is stored, sensing pulses are applied to this series circuit, an appreciable portion of the voltage drop across the series circuit occurs across the saturation diodes and thus a small "0" indicating charge is delivered to the load. However, when information has been stored in the capacitor and a pulse of proper polarity is applied to the circuit to read out this information, then a smaller portion of the voltage drop across the series circuit occurs across the ferroelectric capacitor to cause a reversal of the remanent polarization of the capacitor, which reversal delivers a relatively large output charge to the load. I have found that the insertion of the double anode saturation type diode in series with a barium titanate capacitor has increased the signal-to-noise ratio of the capacitor by a factor of at least three. Similarly, for guanidinium aluminum sulphate hexahydrate, the signal-to-noise ratio is increased by a factor of at least five. Similar high signal-to-noise ratio signals may be derived from the combination of diodes and ferroelectric capacitors wherein the ferroelectric material may be any one of those set forth in B. T. Matthias application Serial No. 489,193, filed February 18, 1955.

Advantageously, other ferroelectric materials of perovskite structure such as potassium niobate may similarly be employed in combination with saturation diodes as herein set forth.

Another important change brought about by the increase in the squareness of the resultant hysteresis loop in accordance with this invention is the effective elimination of disturbing voltages on the unselected capacitors of a storage matrix. If the margins of operation on coincident voltage storage can be placed entirely within the margins of the diodes or other bilateral voltage responsive devices and the total voltage applied to the combination is less than twice the breakdown or avalanche voltage of the series device, disturbing pulses will not reach the unselected capacitors.

Accordingly, it is a feature of this invention to connect a bilateral voltage responsive device in series with a ferroelectric storage capacitor having operating margins within those of the bilateral voltage responsive device.

It is another feature of this invention to connect a pair of oppositely poled saturation diodes exhibiting approximately the same saturation characteristics to pulses of either polarity in series with a ferroelectric capacitor.

It is another feature of this invention to connect a pair of oppositely poled saturation diodes in series with each ferroelectric capacitor of a ferroelectric matrix.

It is a further feature of this invention to connect a pair of saturation diodes in polarity opposition, to connect this combination in series with each of the row electrodes of a ferroelectric matrix and to connect a single saturation diode in series with each of the column electrodes of this ferroelectric matrix.

A complete understanding of this invention and of these and various other features thereof may be gained from consideration of the following detailed description and the accompanying drawing in which.

Figure 1A:
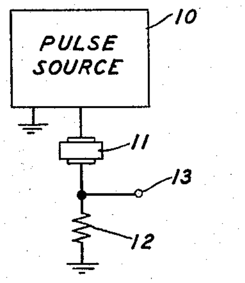
Fig. 1A is a schematic representation of a ferroelectric storage circuit in accordance with the prior art and Figs. 1B through 1F include various time plots of the output signals and hysteresis loops exhibited by circuits of the type shown in Fig. 1A.

Let us now refer to Fig. 1A which shows a ferroelectric storage circuit, of the type disclosed in my Patent 2,717,372, issued September 6, 1955. Pulse source 10 is connected to ferroelectric capacitor 11 and resistor 12 is connected between ground and the other electrode of capacitor 11 while output terminal 13 is connected between resistor 12 and capacitor 11. Assuming that the remanent polarization of the ferroelectric is oriented in a direction to oppose a positive pulse from source 10, this positive pulse will reverse the remanent polarization causing a relatively large output pulse to appear across resistor 12 and thus be available at output terminal 13. If the remanent polarization is initially oriented in the opposite direction, the ferroelectric capacitor effectively presents its small signal capacitance to the positive pulse from source 10 thereby causing a smaller charge to be delivered through resistor 12. Under the first-mentioned condition of remanent polarization, a digit is said to be stored while under the latter condition a "0" is said to be stored. The ratio of the charge delivered when a "1" is sensed to that charge delivered when a "0" is stored in the capacitor is called the signal-to-noise ratio of the circuit. This ratio determines the merit or relative usefulness of the circuit as a storage medium. Any detecting device connected to output terminal 13 must be able to discriminate between the "0" output and the "1" output. Also, with capacitor characteristics subject to any one of the four previously mentioned factors, these values of output signals limit the usefulness of the storage circuit. If, however, the circuit initially possesses a high signal-to-noise ratio, independent of capacitor characteristics, this critical limitation is removed from the detector circuit or other device connected to the output terminal 13 and satisfactory operation is assured.

Figure 1B:
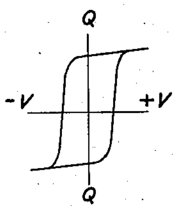
Figure 1C:
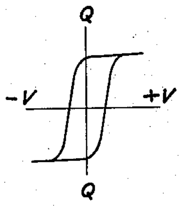
Figure 1D:
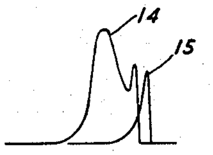

A typical response curve for the ferroelectric capacitor in this type circuit is shown in Fig. 1B which depicts a time plot for a 60 cycle per second hysteresis loop with 10 volts root mean square applied across a .002 inch thick barium titanate crystal having electrodes .004 inch by .004 inch. A similar response curve for the same circuit employing a .001 inch thick guanidinium aluminum sulphate hexahydrate crystal having electrodes 1/16 inch in diameter is shown in Fig. 1C. Fig. 1D shows two output pulses, pulse 14 being the output pulse indicating a "1" being read out from the storage circuit while pulse 15 represents a "0" output pulse. The area under these respective curves determines the total charge delivered to the output circuit or load and hence the ratio of these areas determines the signal-to-noise ratio.

Figure 1E:
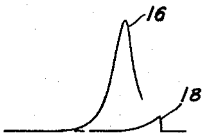
Figure 1F:
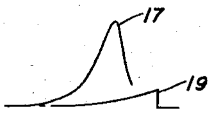

Figs. 1E and 1F are time plots of output pulses from a storage circuit in accordance with Fig. 1A in which a guanidinium aluminum sulphate hexahydrate crystal exhibiting internal bias is employed. In Fig. 1E one electrode is connected to pulse source 10 while in Fig. 1F the other electrode of this same capacitor is connected to pulse source 10. Thus, the comparison of pulse 16 with that of pulse 17 indicates that a different value of "1" pulse is obtained from the same capacitor when sensed from opposite sides. Further, from a comparison of pulse 18 with pulse 19, it is seen that the "0" output signal is increased along at the same time that the "1" output signal is decreased. Thus, the presence of the bias has decreased the signal-to-noise ratio by decreasing the "1" output signal and increasing the "0" output signal.

Figure 2A:
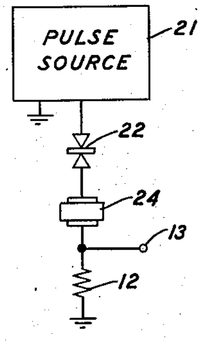
Fig. 2A is a schematic representation of one specific illustrative embodiment of a ferroelectric storage circuit in accordance with this invention and Figs. 2B through 2F include various time plots of the output signals and hysteresis loops exhibited by circuits of the type shown in Fig. 2A.
Figure 2B:
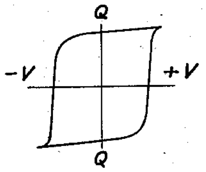
Figure 2C:
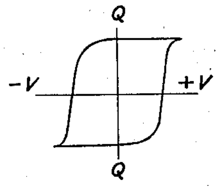

Fig. 2A depicts, in accordance with one specific embodiment of this invention, an improved storage circuit in which pulse source 21 is connected to a series circuit including double anode saturation type diode 22, ferroelectric capacitor 24 and load resistor 12. Diode 22 may alternatively comprise a pair of saturation diodes connected in series opposition as has already been disclosed. Output terminal 13 is connected intermediate resistor 12 and capacitor 24. The double anode saturation type diode modifies the characteristics of the storage circuit by adding saturation characteristics to that of the ferroelectric capacitor. The apparent coercive force of the capacitor is increased by the breakdown voltage of the diode. However, the slope of the top and bottom of the hysteresis loop has been reduced as best seen in Fig. 2B. This may be due to the fact that the diode is acting like a small series capacitor while this portion of the loop is being traversed, thus reducing the total effective capacitance of the ferroelectric and diode combination below the capacitance of the ferroelectric alone. Another important change brought out by the combination is a large increase in the squareness of the hysteresis loop so that the margins of operation can be placed entirely within the margin of the diode unit. By way of contrast of the combined characteristics with that of the capacitor alone, the hysteresis loop of Fig. 1B illustrates the hysteresis loop derived from a .002 inch thick barium titanate crystal while Fig. 2B is the loop derived from the series circuit including this same crystal and a double anode silicon diode. Similarly, Fig. 1C is a hysteresis loop obtained from applying a 10 volt root mean square 60 cycles per second to a .001 inch thick guanidinium aluminum sulphate hexahydrate crystal while the hysteresis loop of Fig. 2C is that derived from the series circuit including this same guanidinium aluminum sulphate hexahydrate crystal and a double anode silicon diode.

Figure 2D:
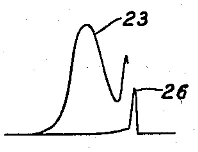

Fig. 2D shows a comparison of the "1" and "0" output pulses obtained from the same barium titanate capacitor employed to produce Fig. 1D connected in the circuit of Fig. 2A. Curve 23 represents a "1" output signal while curve 26 represents a "0" output signal. The improvement of this circuit is seen by comparing the area under pulse 15 of Fig. 1D with that of pulse 26 in Fig. 2D. Thus, by inserting the double anode diode in circuit with the barium titanate capacitor, the signal-to-noise ratio increased by a factor of three.

Figure 2E:
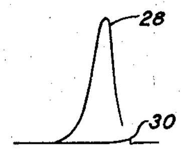
Figure 2F:
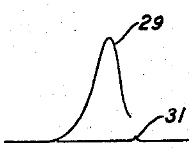

Figs. 2E and 2F show time plots of the same guanidinium aluminum sulphate hexahydrate crystal as that employed in producing Figs. 1E and 1F, which crystal is placed in the circuit of Fig. 2A. A comparison of the "1" output pulse 28 in Fig. 2E with the "1" output pulse 29 in Fig. 2F indicates that the capacitor still exhibits internal bias. However, a comparison of the "0" output pulse 30 in Fig. 2E with the "0" output pulse 31 in Fig. 2F indicates that the presence of the double anode diode practically eliminates the "0" output pulse regardless of the direction in which the capacitor is pulsed. Further, a comparison of pulses 18 and 19 in Figs. 1E and 1F with pulses 30 and 31 indicates the reduced "0" output obtained by using diode 22. In actual operation the insertion of the double anode diode in series with the guanidinium aluminum sulphate hexahydrate crystal increased the signal-to-noise ratio by a factor of at least five.

The ferroelectric capacitor characteristics may be combined with the characteristics of a gas diode in a manner similar to that of the combination of double anode diode and ferroelectric capacitor by connecting the gas diode in series with the capacitor. The gas diode exhibits a bilateral voltage response characteristic similar to that of the double anode diode and thus a substantially square hysteresis loop obtains even though the capacitor exhibits one of the previously mentioned factors. The pulsing voltages required when gas diodes are employed, however, are considerably larger than for circuits utilizing double anode saturation diodes.

Figure 3:
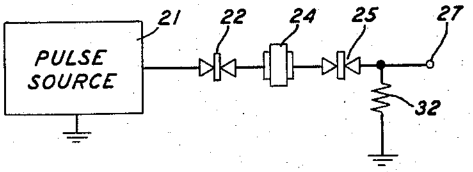
Figs. 3 and 4 are schematic representations of additional illustrative embodiments of ferroelectric storage circuits in accordance with this invention.

Fig. 3 depicts another illustrative embodiment of a ferroelectric storage circuit in accordance with this invention in which the four previously mentioned factors are overcome. Pulse source 21 is connected to one terminal of first double anode saturation diode 22 and the opposite terminal of this diode is connected to ferroelectric capacitor 24 while a series circuit including a second double anode saturation diode 25 and resistor 32 are connected to the other terminal of capacitor 24. Diodes 22 and 25 may each comprise a pair of saturation diodes connected in series opposition as has already been disclosed. Output terminal 27 is connected intermediate diode 25 and load resistor 32.

One possible explanation of the effectiveness of the saturation diode in greatly reducing type I decay is that it helps maintain a charge across the crystal after the switching or driving pulses have been removed. With the diodes connected as illustrated in Fig. 3, the ferroelectric capacitor is completely isolated during the interval when no pulses are applied and thus no leakage of charge may take place. Also, the characteristics of the two pairs of diodes augment those of the ferroelectric capacitor in the same manner as the single pair of Fig. 2A except that the saturation values are doubled.

Figure 4:
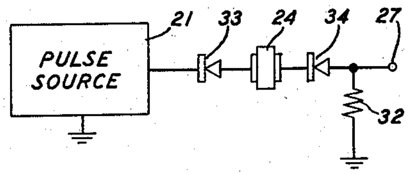

Fig. 4 depicts another specific illustrative embodiment of this invention in which pulse source 21 is connected to a series circuit including a first single anode saturation diode 33, a ferroelectric capacitor 24, a second single anode saturation diode 34 and a load resistor 32. With the diode polarities connected in this manner the left-hand electrode of the ferroelectric capacitor will always be charged more negatively than the right-hand electrode at a potential equal to the total avalanche or breakdown voltage after a negative store pulse. After a positive read-out pulse, the crystal can completely discharge.

In order to set the remanent polarization of capacitor 24, a negative pulse is first applied from source 21. In reading out or reversing this remanent polarization, source 21 supplies a positive pulse to the series circuit. In response to this positive pulse, a large output signal is delivered to load resistor 32 and thus becomes available at output terminal 27. The storage read-out cycle may be repeated by applying another negative pulse from source 21. This circuit is effective in preventing the build-up of space charge on the capacitor as explained above. This build-up of space charge is prevented by the diodes as they maintain a voltage across the capacitor after a store pulse while complete discharge is permitted after a read-out pulse.

Figure 5:
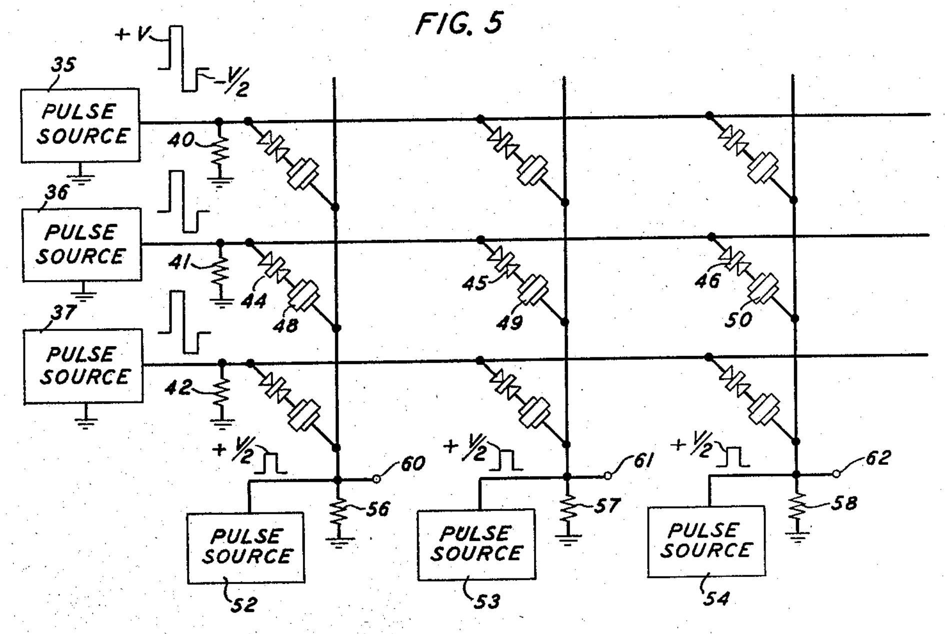
Fig. 5 is a schematic representation of another specific illustrative embodiment of a ferroelectric storage circuit in accordance with this invention.

Fig. 5 illustrates an embodiment of this invention in which individual saturation diodes are connected in series with each capacitor of a ferroelectric matrix. Pulse sources 35, 36 and 37 are connected to individual rows of the matrix while resistors 40, 41 and 42 are load resistors connected respectively to these pulse sources. Diodes 44, 45 and 46 are alternatively pairs of saturation diodes connected in series opposition or double anode saturation diodes of the type previously explained and are connected between pulse source 36 and individual capacitors 48, 49 and 50, respectively. In a similar manner, diodes are connected between the row electrode pulse sources and the individual capacitors of the matrix. Output terminals 60, 61 and 62 are connected intermediate load resistors 56, 57 and 58 and the respective column electrodes. Pulse sources 52, 53 and 54 are connected to individual columns of the matrix.

In order to store a digit in capacitor 48, a negative pulse is applied from source 36 simultaneously with a positive pulse applied from source 52, the magnitudes of each of these pulses being half that required to overcome the saturation diodes plus that required to cause switching in capacitor 48. In order to sense or read out this pulse from capacitor 48, a positive pulse is applied from source 36 equal in magnitude to twice the magnitude of the negative pulse previously applied from this source. In response to this pulse, the saturation diode is overcome and the remanent polarization of capacitor 48 is reversed causing a relatively large output pulse to be delivered to load resistor 56 and thus be available at terminal 60. This previously mentioned positive pulse will not affect capacitors 49 or 50 as their remanent polarization is in a direction to aid the passage of these pulses, that is, no pulses are stored in these capacitors. The unselected capacitors of the matrix connected to either pulse source 36 or source 52 will not be affected by the store pulses applied from these sources, as in each instance the magnitude of these pulses is insufficient to overcome the avalanche or breakdown voltage of the saturation diodes in these unselected storage circuits. Since these unselected capacitors are not disturbed by the storage pulses, a large signal-to-noise ratio may be obtained from this type matrix and the information may be permanently stored without the requirement of restorage at periodic intervals. Similarly, the other three factors are obviated and a high signal-to-noise ratio is insured for each branch of the matrix is in fact an individual storage circuit of the type depicted in Fig. 2A. While only three row and three column electrodes are depicted, it is understood that any number may be employed in a similar manner.

Figure 6:
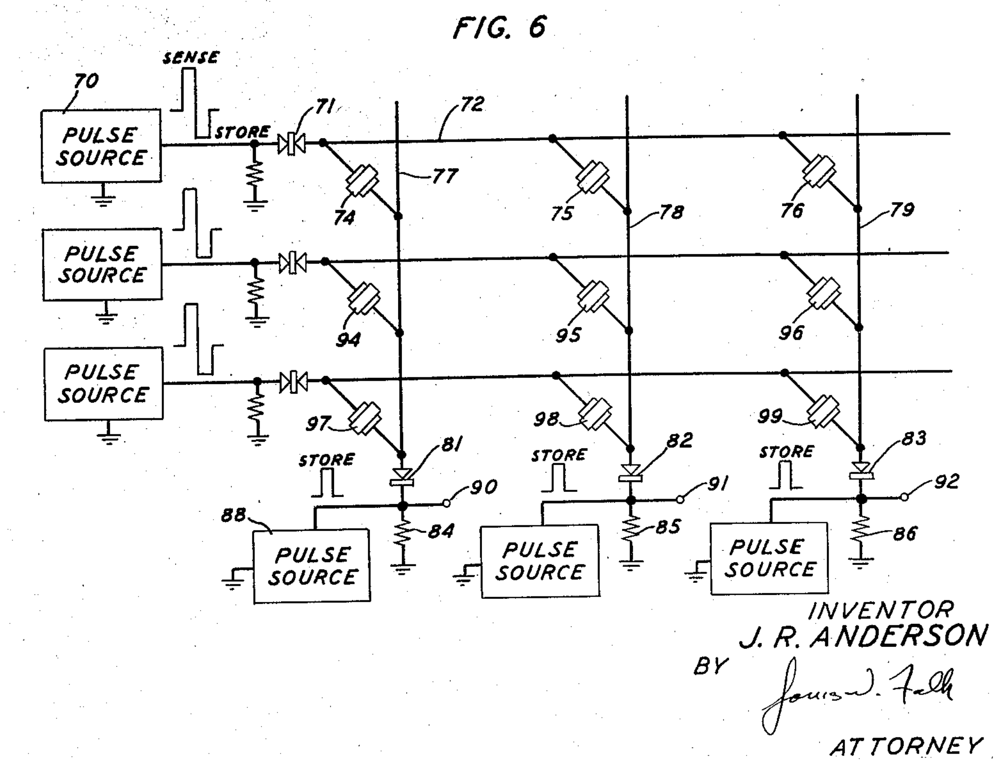
Fig. 6 is a schematic representation of still another illustrative embodiment of this invention.

Fig. 6 illustrates another specific embodiment of this invention in which the four previously mentioned factors are obviated by connecting double anode saturation diodes in series with each row electrode of the matrix and connecting single anode saturation diodes in series with each column electrode of the matrix. Pulse source 70 is connected through double anode saturation diode 71, which may also be a pair of saturation diodes connected in series opposition, as was previously disclosed, to row electrode 72 of the matrix. Capacitors 74, 75 and 76 are capacitors located between electrode 72 and column electrodes 77, 78 and 79, respectively. Single anode saturation diodes 81, 82 and 83 are connected in series with column electrodes 77, 78 and 79, respectively. Output load resistors 84, 85 and 86 are connected to diodes 81, 82 and 83, respectively.

Advantageously, the voltage required to switch these ferroelectric capacitors is less than twice the breakdown voltage of the saturation diodes to insure that the effect of disturbing voltages will be eliminated. If a storage pulse is applied by sources 70 and 88 in such manner that source 70 supplies a negative pulse while source 88 supplies a positive pulse, each equal in magnitude to the avalanche or breakdown voltage of a saturation diode, saturation diodes 71 and 81 will break down and a pulse will be stored in capacitor 74. If now a positive pulse is applied from source 70 having a magnitude sufficient to break down saturation diode 71 and reverse the remanent polarization of capacitor 74, an output pulse will be delivered through diode 81 to load resistor 84 and an output signal may be derived from terminal 90. In response to this positive pulse from source 70, no output signal will be derived from terminals 91 or 92 as the polarization of capacitors 75 and 76 is in a direction to aid the passage of this pulse and thus delivers a "0" signal to these terminals. Further, this positive pulse will not apply a disturbing pulse to the unselected capacitors such as 94 through 99 sufficient to disturb these capacitors, for in order to do so an additional double anode saturation diode must be broken down or saturated.

Thus, in actual operation, each capacitor is serially connected between a double anode saturation diode and a single anode saturation diode to form an improved storage circuit as previously explained. The double anode saturation diodes in series with the row electrodes of the unselected rows effectively prevent the application of disturbing pulses to the capacitors connected to these row electrodes. This novel combination therefore represents an improved matrix which may be expanded to include any desired number of row and column electrodes in which the four previously mentioned factors are obviated.

The advantages of my present invention may be utilized in a wide variety of ferroelectric circuits to improve the operation and characteristics of those circuits with regard to the factors further discussed above. Thus, in ferroelectric shunt switch circuits are disclosed in my application Serial No. 548,034, filed November 21, 1955, the control signal for operating the switch may be applied to the ferroelectric capacitor in a variety of ways. When a voltage breakdown device responsive to voltages of either polarity, such as a double anode saturaton diode, is utilized as disclosed in one embodiment of my prior invention to attain this function, the further advantages herein described are also attained. Accordingly, the principles and circuitry of my present invention have also been incorporated in specific embodiments of my invention disclosed in the above-mentioned application Serial No. 548,034.

Similarly, the principles and circuitry of my present invention have been incorporated in certain embodiments of pulse counting circuits disclosed in application Serial No. 552,459, filed December 12, 1955, of R. M. Wolfe, wherein improved characteristics and particularly prevention of decay result from utilization of voltage breakdown devices responsive to voltages of either polarity.

It is therefore to be noted that the voltage breakdown devices responsive to voltages of either polarity applied thereacross may be utilized in circuits in accordance with aspects of this invention, not only for the purposes herein set forth, but also for various control switching or other functions.

Reference may also be made to my prior application Serial No. 513,710, filed June 7, 1955, wherein a related invention is disclosed in which a voltage breakdown device is utilized as a switch in a ferroelectric shift register circuit and also serves to prevent type I decay.

It is to be understood that the above-described arrangements are illustrative of the application of the principles of the invention. Numerous other arrangements may be devised by those skilled in the art without departing from the spirit and scope of the invention.

What is claimed is:

1. A ferroelectric circuit comprising a condenser having a dielectric of a ferroelectric material and a pair of electrodes, means for preventing the build-up of space charge within said ferroelectric material, said means comprising at least one voltage breakdown device connected in series with said condenser, said voltage breakdown device comprising a diode exhibiting reverse voltage saturation characteristics, and means for applying pulses of opposite polarity in successive time intervals to said series connected condenser and breakdown device to set the ferroelectric condenser to different remanence states upon switching of the breakdown device to the low resistance state.

2. A ferroelectric circuit comprising a condenser having a dielectric of a ferroelectric material and a pair of electrodes, means for preventing the build-up of space charge within said ferroelectric material, said means comprising a pair of oppositely poled saturation breakdown diodes connected in series with said condenser, and means for applying pulses of opposite polarity in successive time intervals to said series connected condenser and breakdown diodes to set the ferroelectric condenser to different remanence states upon switching of the pair of breakdown diodes to the low resistance state.

3. A ferroelectric circuit comprising a condenser having a dielectric of a ferroelectric material and a pair of electrodes, means for preventing the build-up of space charge within said ferroelectric material, said space charge build-up prevention means comprising a first voltage breakdown saturation diode connected to one electrode of said ferroelectric condenser and a second voltage breakdown saturation diode connected to the other electrode of said condenser, said first and second saturation diodes being poled in the same direction, and means for applying pulses of opposite polarity in successive time intervals to said condenser and at least one of said breakdown diodes to set the ferroelectric condenser to different remanence states upon switching of the breakdown diode to the low resistance state.

4. A ferroelectric circuit comprising a condenser having a dielectric of a ferroelectric material and a pair of electrodes, means for preventing the build-up of space charge within said ferroelectric material, said space charge build-up prevention means comprising a first pair of oppositely poled voltage breakdown saturation diodes connected to one electrode of said condenser and a second pair of oppositely poled voltage breakdown saturation diodes connected to the other electrode of said condenser, and means for applying pulses of opposite polarity in succssive time intervals to said condenser and at least one of said pairs of breakdown diodes to set the ferroelectric condenser to different remanence states upon switching of the pair of breakdown diodes to the low resistance state.

5. A ferroelectric circuit having a high signal-to-noise ratio comprising a condenser having a dielectric of a ferroelectric material, voltage breakdown switching means responsive to voltages of either polarity serially connected to said condenser, and pulse source means for applying voltages across said condenser and said voltage breakdown switching means of either polarity sufficient to break down said switching means and to reverse the remanent polarization of said ferroelectric material.

6. A ferroelectric circuit having a high signal-to-noise ratio comprising a series circuit including a condenser having a dielectric of ferroelectric material and a pair of electrodes, a first pair of voltage breakdown saturation diodes connected to one of said electrodes, and a second pair of voltage breakdown saturation diodes connected to the other of said electrodes, pulse source means for applying voltages to said condenser and diodes, and output means connected to said circuit.

7. A ferroelectric circuit in accordance with claim 6 wherein each pair of saturation diodes is connected in series opposition.

8. A ferroelectric circuit comprising a series circuit including a condenser having a dielectric of a ferroelectric material and a pair of electrodes, a first voltage breakdown saturation diode connected to one of said electrodes, and a second voltage breakdown saturation diode connected to the other of said electrodes, pulse source means for applying voltages to said diodes and said condenser, and output means connected to said series circuit.

9. A ferroelectric circuit in accordance with claim 8 wherein said diodes are poled in the same direction.

10. A ferroelectric circuit in accordance with claim 9 wherein said pulse source means applies storage pulses of a first polarity to said series circuit and read-out pulses of the opposite polarity to said series circuit, said diodes being poled to be broken down by said read-out pulses.

11. A ferroelectric circuit having a high signal-to-noise ratio comprising a pulse source, a series circuit connected to said pulse source and including a condenser having a dielectric of a ferroelectric material and bilateral voltage responsive means having breakdown voltages greater than the voltages required to reverse the state of polarization of said ferroelectric material, and output means connected to said series circuit.

12. A ferroelectric circuit having a high signal-to-noise ratio comprising a pulse source, a series circuit connected to said pulse source and including a ferroelectric condenser and bilateral voltage breakdown means having approximately equal characteristics to pulses of either polarity from said pulse source and output means connected to said series circuit.

13. A ferroelectric circuit comprising a condenser having a dielectric of ferroelectric material exhibiting an internal bias, a pulse source connected to said condenser, and means effectively canceling the internal bias of said ferroelectric material, said last-mentioned means comprising bilateral voltage breakdown switching means connected to said condenser.

14. A ferroelectric storage circuit comprising a condenser having a dielectric of a ferroelectric material and a pair of electrodes, a pair of diodes serially connected in polarity opposition and connected to one electrode of said condenser, one of said diodes exhibiting a reverse voltage saturation characteristic and means for applying voltage pulses to said condenser and said pair of diodes.

15. A ferroelectric storage circuit in accordance with claim 14 wherein the reverse saturation voltage of said one diode is at least as large as the voltage required to switch the state of polarization of said ferroelectric material.

16. An electrical circuit comprising a ferroelectric condenser, a pair of diodes connected to said ferroelectric condenser, said diodes being poled in series opposition and at least one of said diodes having a reverse saturation characteristic, means for applying pulses across said condenser and said diodes to switch the state of said condenser, and output means connected to said pair of diodes and said condenser.

17. A ferroelectric storage circuit having a high signal-to-noise ratio including a plurality of pulse sources, a ferroelectric matrix having row and column electrodes and wherein certain of its row electrodes are connected to certain of said pulse sources, a plurality of double anode saturation diodes individually connected in series between each row electrode and each ferroelectric capacitor, output means connected to said matrix, and pulse means connected to each column electrode of said matrix.

18. A ferroelectric circuit having a high signal-to-noise ratio including a ferroelectric matrix having row and column electrodes, a plurality of pulse sources connected to the rows of said matrix, a plurality of double anode saturation diodes individually connected between said pulse sources and said row electrodes, a plurality of single anode saturation diodes connected in series with each column electrode of said matrix, pulse means connected to each single anode diode remote from said column electrodes and output means intermediate said single anode diodes and said last-mentioned pulse means.

References Cited in the file of this patent

UNITED STATES PATENTS

| | | |
|---|---|---|
| 2,666,195 | Bachelet et al. | Jan. 12, 1954 |
| 2,691,155 | Rosenburg et al. | Oct. 5, 1954 |
| 2,691,156 | Saltz | Oct. 5, 1954 |
| 2,724,103 | Asenhurst | Nov. 15, 1955 |

OTHER REFERENCES

"Ferroelectrics For Digital Information Storage and Switching" (Buck), Report R–212 of the Digital Computer Laboratory of M. I. T., June 5, 1952 (pages 9 to 13 and Figures 5 and 7 to 9).